(12) United States Patent
Komatsu

(10) Patent No.: US 6,192,170 B1
(45) Date of Patent: Feb. 20, 2001

(54) MULTIPLE-WAVELENGTH LIGHT SOURCE AND METHOD OF CONTROLLING OSCILLATION FREQUENCIES THEREOF

(75) Inventor: Keiro Komatsu, Tokyo (JP)

(73) Assignee: NEC Corporation (JP)

( * ) Notice: Under 35 U.S.C. 154(b), the term of this patent shall be extended for 0 days.

(21) Appl. No.: 09/451,556

(22) Filed: Dec. 1, 1999

(30) Foreign Application Priority Data

Dec. 2, 1998 (JP) ............................................ 10-343280

(51) Int. Cl.[7] .................................................. G02B 6/26
(52) U.S. Cl. ................................................ 385/15; 385/24
(58) Field of Search .................................. 359/127, 133; 385/24, 15, 37

(56) References Cited

U.S. PATENT DOCUMENTS

| | | | |
|---|---|---|---|
| 5,396,506 | * 3/1995 | Ball | 385/24 |
| 5,550,666 | * 8/1996 | Zirngibl | 359/133 |
| 5,870,512 | * 2/1999 | Koch et al. | 385/24 |
| 6,061,158 | * 5/2000 | Delong | 359/133 |

FOREIGN PATENT DOCUMENTS

| | | | |
|---|---|---|---|
| 9-172429 | 6/1997 | (JP) | H04J/14/00 |
| 10-48440 | 2/1998 | (JP) | G02B/6/12 |
| 10-68833 | 3/1998 | (JP) | G02B/6/13 |

OTHER PUBLICATIONS

T. Tanaka et al; Integrated External Cavity Laser COmposed of Spot–Size COnverted LD and UV Written Grating in Silica Waveguide on Si, Electron Letters; 1995; vol. 32; No. 13, pp. 1202–1203.

T. Tanaka et al, A Wavelength Hybrid Laser Array Composed of Spot–Size Converter Integrated LD and UV Written Grating in Silica Waveguide on Si, Electronic COmmunications Society General Conference; 1997; C–3–160; p. 345.

H. Kobayashi et al, Tapered Thickness MQW Waveguide BH MQW Lasers, Electronics Communications Society General Conference; 1995; SC–4–4, pp. 463–464.

(List continued on next page.)

Primary Examiner—Hung N. Ngo
(74) Attorney, Agent, or Firm—Hayes, Soloway, Hennessey, Grossman & Hage, P.C.

(57) ABSTRACT

A multiple-wavelength light source has a plurality of semiconductor laser devices, a plurality of optical waveguides for leading laser beams from the semiconductor laser devices to respective desired paths, and a plurality of diffraction gratings as external cavities for the semiconductor laser devices. The multiple-wavelength light source can output laser beams of respective wavelengths determined by structural details of the diffraction gratings. The multiple-wavelength light source also has an optical combiner for multiplexing the laser beams from the semiconductor laser devices into a laser beam, an optical wavelength multiplexer/demultiplexer for demultiplexing the laser beam from the optical combiner into a plurality of laser beams of respective desired wavelengths, and outputting the laser beams, a plurality of photodetectors for detecting the laser beams from the optical wavelength multiplexer/demultiplexer and outputting voltages depending on respective detected laser beam power levels, a plurality of heaters disposed near the diffraction gratings for varying temperatures of the diffraction gratings, and a heater current control circuit for supplying currents to the heaters for maximizing the output voltages from the photodetectors.

12 Claims, 4 Drawing Sheets

OTHER PUBLICATIONS

T. Sugie et al, 1.3 um LD with Butt–Jointed Selectively Grown Spot–Size Converter, Electronics Communications Society General Conference; 1995; SC–4–5, pp. 465–466.

A. Takemoto et al, Title unreadable, Mitsubishi Denki Giho; vol. 71; No. 3; 1997, pp. 59–62.

S. Suzuki, Title unreadable, Japanese Journal of Optics; vol. 26; No. 8; 1997, pp. 418–423.

S. Suzuki, Silica–based Planar Lightwave Circuits, Ceramics Japan; vol. 32; No. 8; 1997, pp. 613–617.

* cited by examiner

MULTIPLE-WAVELENGTH LIGHT SOURCE AND METHOD OF CONTROLLING OSCILLATION FREQUENCIES THEREOF

BACKGROUND OF THE INVENTION

1. Field of the Invention

The present invention relates to a multiple-wavelength light source for use as a light source for a wavelength-division-multiplexing (WDM) optical communication system, and a method of controlling oscillation frequencies of such a multiple-wavelength light source.

2. Description of the Related Art

Heretofore, one conventional multiple-wavelength light source for use as a light source for a WDM optical communication system comprises a multiple-wavelength semiconductor laser as shown in FIG. 1 of the accompanying drawings.

The conventional multiple-wavelength semiconductor laser, which has been reported by Tanaka et al. in collected preprints for Electronic Communications Society General Conference, 1997, C-3-160, has four spot size convertor integrated lasers (hereinafter referred to as "SS-LD"), four optical waveguides (PLC: Planar Lightwave Circuits) of silica, and diffraction gratings produced by UV photolithography, all integrated on an Si substrate. It has been confirmed that the conventional multiple-wavelength semiconductor laser performs simultaneous oscillation at four wavelengths in a single mode.

More specifically, as shown in FIG. 1, the conventional multiple-wavelength semiconductor laser comprises four SS-LDs 102 for emitting laser beams having respective oscillation wavelengths, four optical waveguides 103 for leading the laser beams emitted by SS-LDs 102 to output end face 105, and four diffraction gratings 104 disposed in the respective optical waveguides 103 and serving as external cavities for SS-LDs 102. SS-LDs 102, optical waveguides 103, and diffraction gratings 104 are integrated on Si substrate 101. Output end face 105 is coated with an antireflection coating for minimizing reflection of the laser beams. While the conventional multiple-wavelength semiconductor laser shown in FIG. 1 emits laser beams having four oscillation wavelengths $\lambda 1-\lambda 4$, it can produce more oscillation wavelengths by adding one or more elemental structures in a parallel arrangement.

Each of SS-LDs 102 has a tapered waveguide for narrowing the radiation angle of the emitted laser beam thereby to reduce an optical coupling loss with optical waveguide 103. Use of SS-LDs 102 is effective to lower the cost of the multiple-wavelength semiconductor laser because it does not require optical lenses for changing the radiation angles of the emitted laser beams.

Each of diffraction gratings 104 is fabricated by exposing an $SiO_2$ layer (which will become an upper cladding layer) above the core of optical waveguide 103 to interference UV radiation. Structural details, including a grating pitch and a shape, of diffraction gratings 104 determine the oscillation wavelengths of the laser beams output from output end face 105.

However, the conventional multiple-wavelength semiconductor laser has been problematic in that since the oscillation wavelengths of the multiple-wavelength semiconductor laser are determined by the fabrication accuracy of the diffraction gratings, the yield of fabricated devices is poor if they are to be used as a light source for a WDM optical communication system because such a light source needs accurate wavelength settings.

SUMMARY OF THE INVENTION

It is therefore an object of the present invention to provide a multiple-wavelength light source which allows oscillation wavelengths to be finely adjusted for an increased yield of fabricated devices.

To achieve the above object, a multiple-wavelength light source in accordance with the present invention has a plurality of heaters disposed near respective diffraction gratings for controlling the temperatures of the diffraction gratings. The temperatures of the respective heaters are controlled in a feedback loop in order to output maximum optical power levels at desired wavelengths. At this time, photodetectors output voltages depending on the optical power levels at the desired wavelengths, and a heater current control circuit supplies currents to the heaters in order to maximize the output voltages from the photodetectors.

Currents injected into the semiconductor laser devices may be modulated with different frequencies, and modulation frequency components are extracted from output signals from the photodetectors by electric filters. Currents are supplied to the heaters in order to maximize voltages of the extracted modulation frequency components.

In the multiple-wavelength light source, when the ambient temperature of the diffraction gratings is varied by the heaters disposed near the diffraction gratings, the oscillation frequencies of the semiconductor laser devices fluctuate because the refractive index of cores of optical waveguides beneath the diffraction gratings also varies. By supplying currents to the heaters in order to maximize the output voltages of the photodetectors, the oscillation frequencies of the semiconductor laser devices can accurately be controlled at desired frequencies.

Currents injected into the semiconductor laser devices may be modulated with different frequencies, and modulation frequency components are extracted from output signals from the photodetectors by electric filters. Currents are supplied to the heaters in order to maximize voltages of the extracted modulation frequency components for thereby controlling the oscillation frequencies of the semiconductor laser devices accurately at desired frequencies.

The above and other objects, features, and advantages of the present invention will become apparent from the following descriptions with reference to the accompanying drawings which illustrate examples of the present invention.

DETAILED DESCRIPTION OF THE PREFERRED EMBODIMENTS

Figure 1:
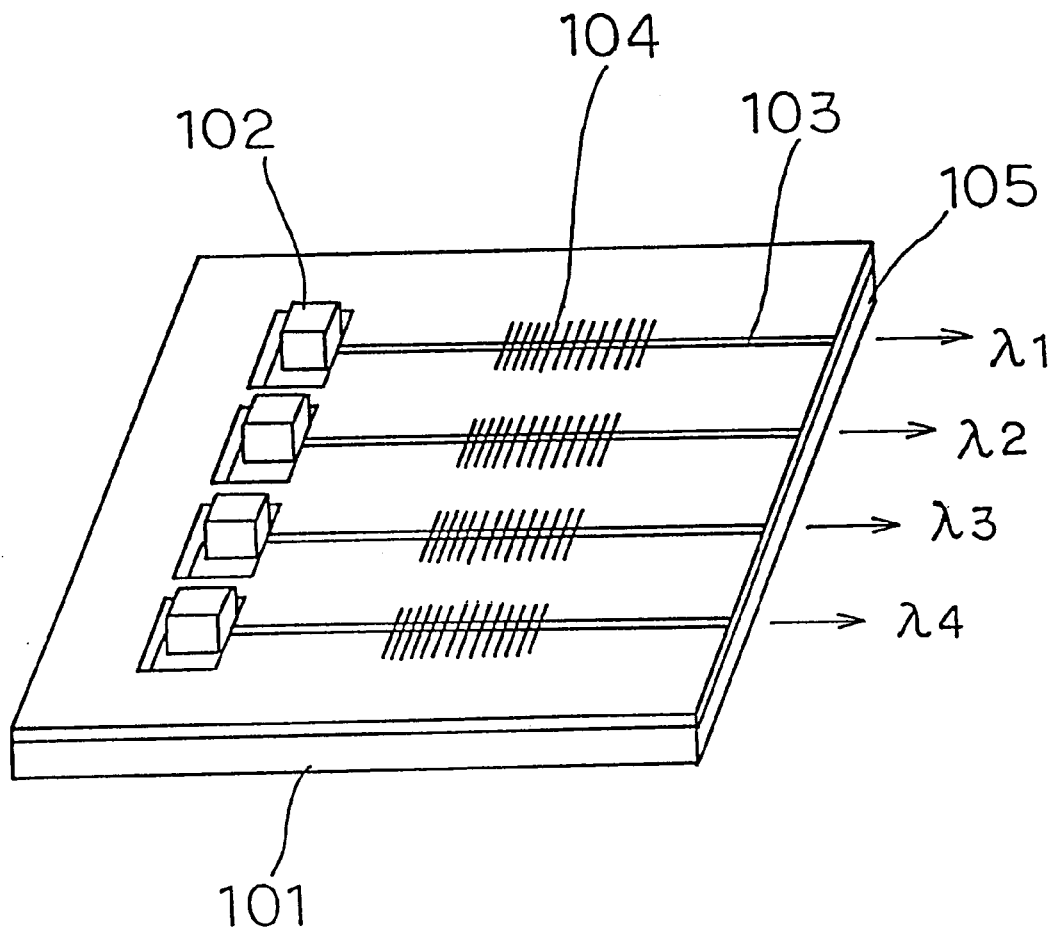
FIG. 1 is a perspective view of a conventional multiple-wavelength light source.

In the conventional multiple-wavelength semiconductor laser shown in FIG. 1, when the ambient temperature varies, the refractive index of the cores of the optical waveguides also varies. Therefore, when the diffraction gratings operate as external cavities, the feedback (reflected) amount of the beam varies depending on the wavelength, resulting in a variation in the oscillation wavelengths. According to the present invention, heaters are positioned near the diffraction gratings of the conventional multiple-wavelength semiconductor laser for controlling the temperatures of the diffraction gratings, and the temperatures of the heaters are controlled in a feedback loop to output maximum optical power at desired wavelengths ($\lambda 1$–$\lambda 4$).

1st Embodiment

Figure 2:
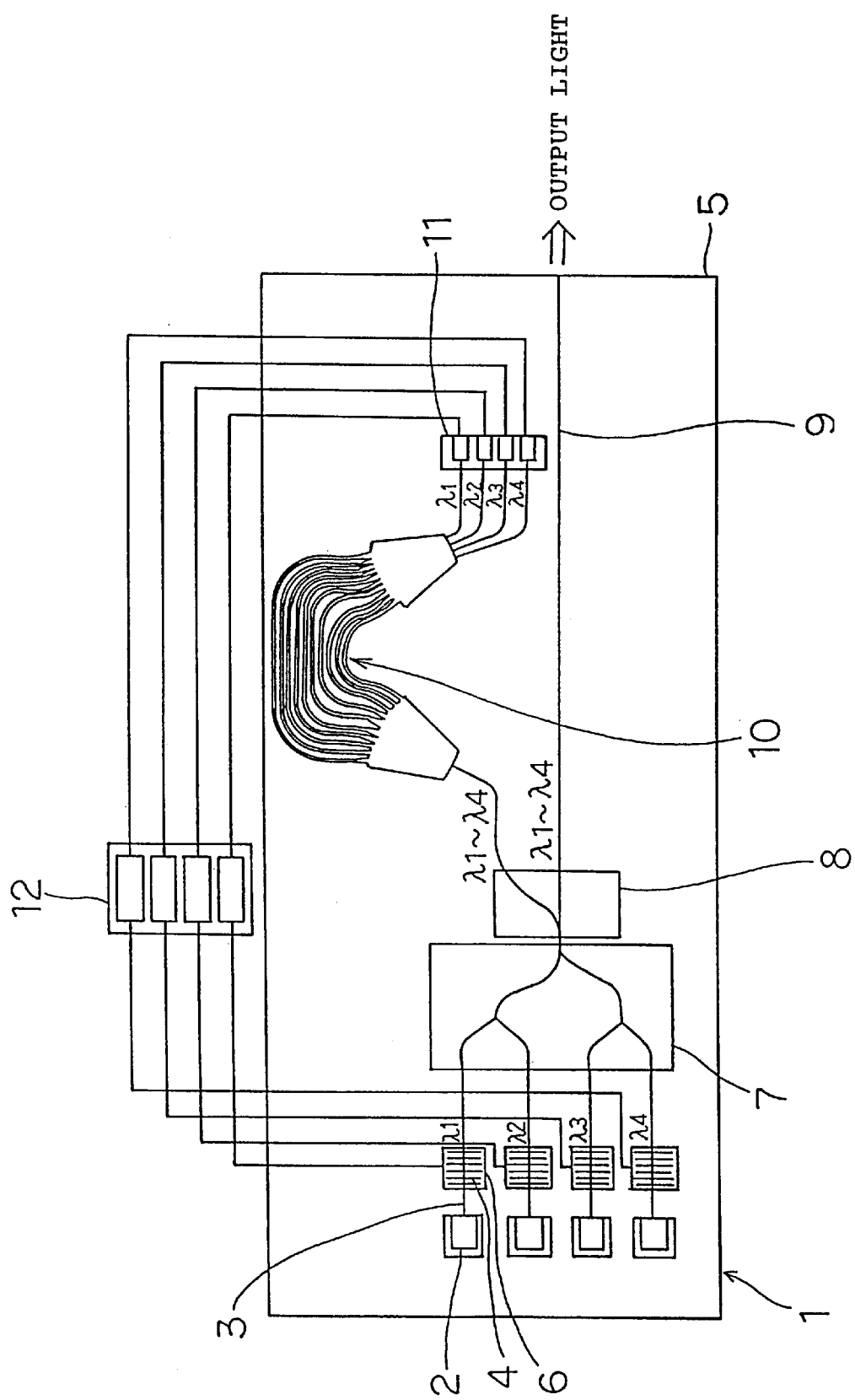
FIG. 2 is a schematic plan view of a multiple-wavelength light source according to a first embodiment of the present invention.

As shown in FIG. 2, a multiple-wavelength light source according to a first embodiment of the present invention comprises a plurality of semiconductor laser devices 2 for emitting laser beams having respective oscillation wavelengths, a plurality of input optical waveguides 3 for leading the laser beams emitted from semiconductor laser devices 2 to desired paths, a plurality of diffraction gratings 4 disposed in the input optical waveguides 3 and serving as external cavities for semiconductor laser devices 2, and a plurality of heaters 6 disposed near the respective diffraction gratings 4 for varying the temperatures of diffraction gratings 4. Semiconductor laser devices 2, input optical waveguides 3, diffraction gratings 4, and heaters 6 are disposed on Si substrate 1 in as many sets as the number of desired oscillation wavelengths to be produced. Si substrate 1 also supports thereon optical combiner 7 for multiplexing laser beams from input optical waveguides 3 into a laser beam, optical branching circuit 8 for branching a laser beam from optical combiner 7 into two laser beams, output optical waveguide 9 for leading one of the laser beams from optical branching circuit 8 to output end face 5, optical wavelength multiplexer/demultiplexer 10 for demultiplexing the other one of the laser beams from optical branching circuit 8 into a plurality of laser beams having respective desired wavelengths ($\lambda 1$–$\lambda 4$), and a plurality of photodetectors 11 for detecting the laser beams of the respective desired wavelengths from optical wavelength multiplexer/demultiplexer 10 and outputting voltages depending on the respective detected power levels of the laser beams. The multiple-wavelength light source also has heater current control circuit 12 disposed outside of Si substrate 1 for supplying currents to the respective heaters 6 for maximizing the output voltages from photodetectors 11.

Each of semiconductor lasers 2 comprises SS-LD, and each of diffraction gratings 4 is patterned on Si substrate 1 by UV radiation. Each of input optical waveguides 3, optical branching circuit 8, output optical waveguide 9, and optical wavelength multiplexer/demultiplexer 10 comprises a PLC. While the multiple-wavelength semiconductor laser shown in FIG. 2 emits laser beams having four oscillation wavelengths $\lambda 1$–$80$ 4, it can produce more oscillation wavelengths by adding one or more elemental structures in a parallel arrangement. Heater current control circuit 12 may be integrated on Si substrate 1.

Semiconductor lasers 2 emit respective laser beams having respective oscillation wavelengths determined by the respective diffraction gratings 4 which serve as external cavities for semiconductor lasers 2. The laser beams emitted from semiconductor lasers 2 are let by input optical waveguide 3 to optical combiner 7, which combines the laser beams into a single laser beam.

The laser beam including the oscillation wavelengths combined by optical combiner 7 is branched into two laser beams by optical branching circuit 8. One of the laser beams is led to output end face 5 by output optical waveguide 9, and the other laser beam is. demultiplexed into a plurality of laser beams having respective oscillation wavelengths $\lambda 1$–$\lambda 4$ by optical wavelength multiplexer/demultiplexer 10.

Figure 3:
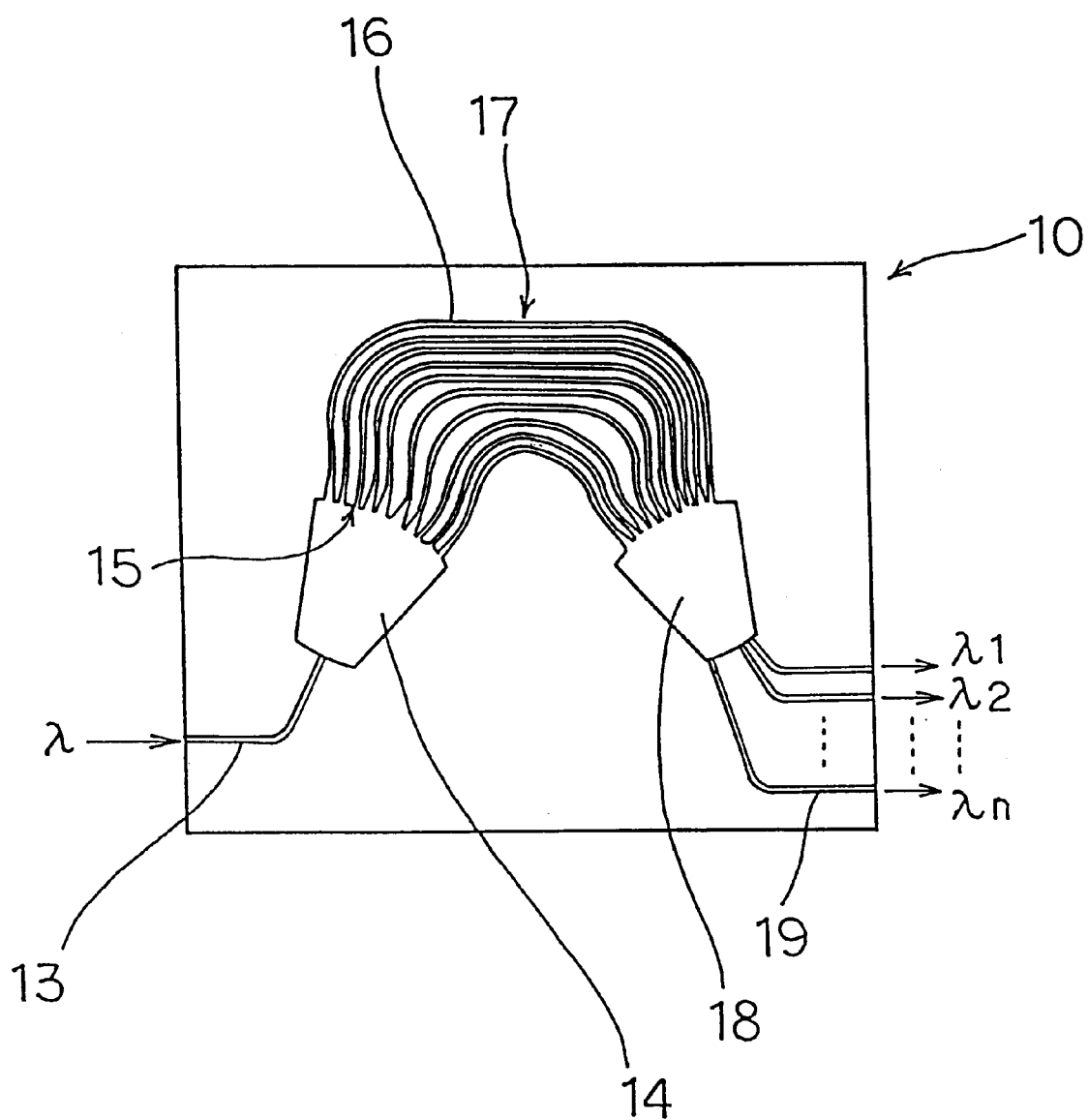
FIG. 3 is a schematic plan view of an optical wavelength multiplexer/demultiplexer in the multiple-wavelength light source shown in FIG. 2.

As shown in FIG. 3, optical wavelength multiplexer/demultiplexer 10 comprises input channel waveguide 13, first fan-shaped slab waveguide 14 connected to input channel waveguide 13, array waveguide diffraction grating 17 comprising a plurality of channel waveguides 16 connected perpendicularly to diffracting surface 15 of first fan-shaped slab waveguide 14 and having predetermined wavelength length differences, second fan-shaped slab waveguide 18 connected to array waveguide diffraction grating 17, and a plurality of output channel waveguides 19 connected to second fan-shaped slab waveguide 18.

A laser beam input from input channel waveguide 13 is spread by a diffracting action of first fan-shaped slab waveguide 14 and led to array waveguide diffraction grating 17 connected perpendicularly to diffracting surface 15 of first fan-shaped slab waveguide 14. The laser beam is then introduced into channel waveguides 16 of the array waveguide diffraction grating 17 and is propagated through channel waveguides 16 to second fan-shaped slab waveguide 18.

The laser beams introduced into respective channel waveguides 16 are given phase differences depending on the wavelength length differences between channel waveguides 16. After these laser beams have interfered with each other in second fan-shaped slab waveguide 18, they are applied to output channel waveguides 19. Since the laser beams are dispersed by the phase differences given by array waveguide diffraction grating 17, the laser beams of different wavelengths are applied to the respective output channel waveguides 19. Therefore, optical wavelength multiplexer/demultiplexer 10 is capable of demultiplexing the input laser beam into a plurality of laser beams at desired wavelength intervals.

The laser beams demultiplexed by optical wavelength multiplexer/demultiplexer 10 are then applied to photodetectors 11, which output voltages depending on the detected power levels of the laser beams. The output voltages from photodetectors 11 are supplied to heater current control circuit 12, which supplies currents to the respective heaters 6 in order to maximize the output voltages of photodetectors 11.

Since semiconductor laser devices 2 are accurately controlled so as to oscillate for maximum optical power levels at the desired wavelengths, the fabrication accuracy of diffraction gratings 4 can be lowered. As a result, the yield of fabricated devices for use as a light source for a WDM optical communication system can be increased.

For the purpose of controlling the temperatures of diffraction gratings 4, it may be possible to control the temperature of Si substrate 1 in its entirety. With such a temperature control arrangement, however, the temperatures of diffraction gratings 4 cannot individually be controlled for the respective wavelengths, and hence the accuracy of the oscillation wavelengths of semiconductor laser devices 2 is unduly reduced. Furthermore, since $SiO_2$ of diffraction gratings 4 generally has poor thermal conductivity, any change in the oscillation wavelengths caused by this temperature control arrangement is small, resulting in poor temperature controllability.

2nd Embodiment

Figure 4:
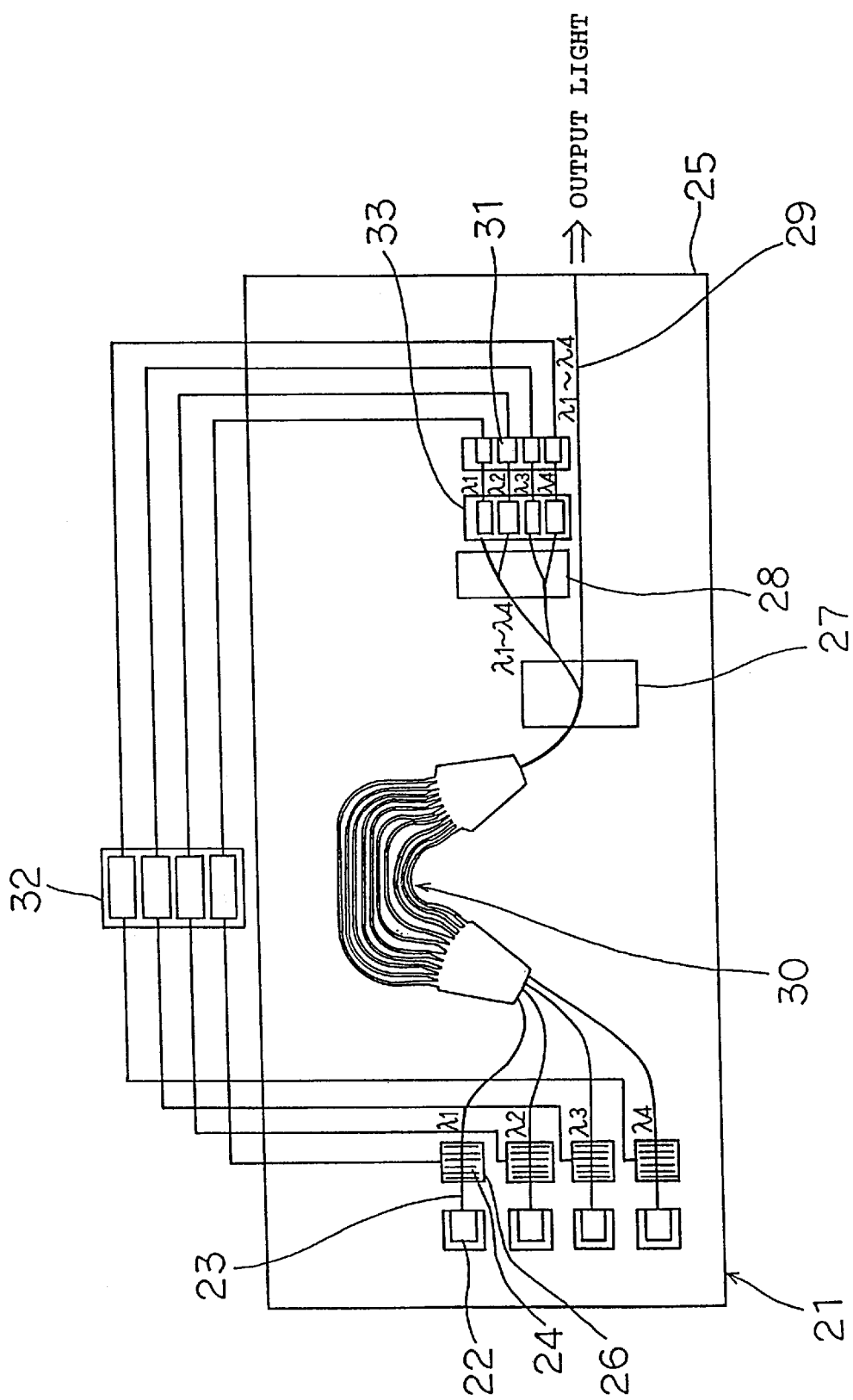
FIG. 4 is a schematic plan view of a multiple-wavelength light source according to a second embodiment of the present invention.

As shown in FIG. 4, a multiple-wavelength light source according to a second embodiment comprises a plurality of semiconductor laser devices 22 for emitting laser beams having respective oscillation wavelengths, a plurality of input optical waveguides 23 for leading the laser beams emitted from semiconductor laser devices 22 to desired paths, a plurality of diffraction gratings 24 disposed in the input optical waveguides 23 and serving as external cavities for semiconductor laser devices 22, and a plurality of heaters 26 disposed near the respective diffraction gratings 24 for varying the temperatures of diffraction gratings 24. Semiconductor laser devices 22, input optical waveguides 23, diffraction gratings 24, and heaters 26 are disposed on Si substrate 21 in as many sets as the number of desired oscillation wavelengths to be produced.

Si substrate 21 also supports thereon optical wavelength multiplexer/demultiplexer 30 for multiplexing laser beams from input optical waveguides 23, first optical branching circuit 27 for branching a laser beam from optical wavelength multiplexer/demultiplexer 30 into two laser beams, output optical waveguide 29 for leading one of the laser beams from first optical branching circuit 27 to output end face 25, second optical branching circuit 28 for branching the other laser beam from first optical branching circuit 27 into as many laser beams as the number of desired oscillation wavelengths, wavelength filter 33 for passing only the laser beams of the desired oscillation wavelengths ($\lambda 1$–$\lambda 4$) among the laser beams output from second optical branching circuit 28, and a plurality of photodetectors 31 for detecting the laser beams output from wavelength filter 33 and outputting voltages depending on the respective detected power levels of the laser beams. The multiple-wavelength light source also has heater current control circuit 32 disposed outside of Si substrate 1 for supplying currents to the respective heaters 26 for maximizing the output voltages from photodetectors 31.

Each of semiconductor lasers 22 comprises SS-LD, and each of diffraction gratings 24 is patterned on Si substrate 1 by UV radiation. Each of input optical waveguides 23, optical wavelength multiplexer/demultiplexer 30, first optical branching circuit 27, second optical branching circuit 28, and output optical waveguide 29 comprises a PLC. Optical wavelength multiplexer/demultiplexer 30 is identical to optical wavelength multiplexer/demultiplexer 10 shown in FIG. 3.

In the second embodiment, a plurality of laser beams having different wavelengths are supplied to optical wavelength multiplexer/demultiplexer 30 via output channel waveguides 19, and input channel waveguide 13 outputs a multiplexed laser beam. While the multiple-wavelength semiconductor laser shown in FIG. 4 emits laser beams having four oscillation wavelengths $\lambda 1$–$\lambda 4$, it can produce more oscillation wavelengths by adding one or more elemental structures in a parallel arrangement. Heater current control circuit 32 may be integrated on Si substrate 21.

Laser beams emitted from semiconductor laser devices 22 are multiplexed into a single laser beam by optical wavelength multiplexer/demultiplexer 30 which causes a small loss, and the laser beam from optical wavelength multiplexer/demultiplexer 30 is branched into two laser beams by first optical branching circuit 27. One of the laser beams from first optical branching circuit 27 is led to output end face 25 by output optical waveguide 29, and the other laser beam is branched into as many laser beams as the number of desired oscillation wavelengths by second optical branching circuit 28. Wavelength filter 33 then extracts laser beams of the desired oscillation wavelengths. In the second embodiment, the output laser beams from wavelength filter 33 are detected by photodetectors 31, and the currents supplied to heaters 26 are controlled by heater current control circuit 32 in order to maximize the output voltages from photodetectors 31. In this manner, the oscillation wavelengths of semiconductor laser devices 22 can accurately be controlled at desired wavelengths.

In FIG. 4, the output laser beams from second optical branching circuit 28 are passed through wavelength filter 33, and the output laser beams from wavelength filter 33 are detected by photodetectors 31. However, the output laser beams from second optical branching circuit 28 may be detected directly by photodetectors 31. In this modification, since photodetectors 31 output only voltages depending on the detected power level of the multiplexed laser beam, it is not possible to detect optical power levels corresponding to the laser beams from the respective semiconductor laser devices 22. To avoid such a shortcoming, a non-illustrated frequency modulating circuit is added to modulate currents injected into semiconductor laser devices 22 with low frequencies which differ from laser beam to laser beam, and electric filters are provided behind the photodetectors for passing only modulation frequency components. The electric filters are thus capable of outputting the modulation frequency components which correspond to the optical power levels of semiconductor laser devices 22. By controlling the currents supplied from heater current control circuit 32 to heaters 26 in order to maximize the output voltages from the electric filters, the oscillation wavelengths of semiconductor laser devices 22 can accurately be controlled at desired wavelengths.

The multiple-wavelength light source according to the first embodiment outputs the laser beams emitted from semiconductor laser devices 2 via optical combiner 7 and optical branching circuit 8. Therefore, the optical power levels of the laser beams suffer a loss caused by optical combiner 7 and optical branching circuit 8.

However, the multiple-wavelength light source according to the second embodiment outputs the laser beams emitted from semiconductor laser devices 22 after they have been multiplexed by optical wavelength multiplexer/demultiplexer 30 with a small loss, via only first optical branching circuit 27. Therefore, any loss in the power levels of the laser beams is reduced by an amount commensurate with the loss caused by optical combiner 7 according to the first embodiment. Consequently, the currents supplied to energize semiconductor laser devices 22 may be smaller than those required to energize semiconductor laser devices 2 in the first embodiment, so that the current consumed by the multiple-wavelength light source according to the second embodiment can be reduced.

While preferred embodiments of the present invention have been described using specific terms, such description is for illustrative purposes only, and it is to be understood that changes and variations may be made without departing from the spirit or scope of the following claims.

What is claimed is:

1. A multiple-wavelength light source comprising:
   a plurality of semiconductor laser devices;
   a plurality of optical waveguides for leading laser beams emitted from said semiconductor laser devices to respective desired paths;
   a plurality of diffraction gratings disposed in said optical waveguides, respectively, and serving as external cavities for said semiconductor laser devices, whereby laser beams having respective wavelengths determined by structural details of said diffraction gratings can be output;
   an optical combiner for multiplexing the laser beams emitted from said semiconductor laser devices into a laser beam;
   an optical wavelength multiplexer/demultiplexer for demultiplexing the laser beam from the optical combiner into a plurality of laser beams having respective desired wavelengths, and outputting the laser beams;

a photodetector for detecting the laser beams from said optical wavelength multiplexer/demultiplexer and outputting voltages depending on respective detected power levels of the laser beams;

a plurality of heaters disposed near said diffraction gratings, respectively, for varying temperatures of said diffraction gratings; and a heater current control circuit for supplying currents to said heaters, respectively, for maximizing the output voltages from said photodetectors.

2. The multiple-wavelength light source according to claim 1, further comprising a common substrate, said semiconductor laser devices, said optical waveguides, said diffraction gratings, said optical combiner, said optical wavelength multiplexer/demultiplexer, said photodetectors, and said heaters being disposed on said common substrate.

3. The multiple-wavelength light source according to claim 1, wherein said optical wavelength multiplexer/demultiplexer comprises optical waveguides of silica including:

an input channel waveguide;

a first fan-shaped slab waveguide connected to said input channel waveguide;

an array waveguide diffraction grating comprising a plurality of channel waveguides connected perpendicularly to a diffracting surface of said first fan-shaped slab waveguide and having predetermined wavelength length differences;

a second fan-shaped slab waveguide connected to said array waveguide diffraction grating; and a plurality of output channel waveguides connected to said second fan-shaped slab waveguide.

4. A multiple-wavelength light source comprising:

a plurality of semiconductor laser devices;

a plurality of optical waveguides for leading laser beams emitted from said semiconductor laser devices to respective desired paths;

a plurality of diffraction gratings disposed in said optical waveguides, respectively, and serving as external cavities for said semiconductor laser devices, whereby laser beams having respective wavelengths determined by structural details of said diffraction gratings can be output;

an optical wavelength multiplexer/demultiplexer for multiplexing the laser beams emitted from said semiconductor laser devices into a laser beam;

an optical branching circuit for branching the laser beam from said optical wavelength multiplexer/demultiplexer into as many laser beams as the number of desired wavelengths;

a wavelength filter for extracting laser beams of desired wavelengths from the laser beams from said optical branching circuit;

a photodetector for detecting the laser beams from said wavelength filter and outputting voltages depending on respective detected power levels of the laser beams;

a plurality of heaters disposed near said diffraction gratings, respectively, for varying temperatures of said diffraction gratings; and a heater current control circuit for supplying currents to said heaters, respectively, for maximizing the output voltages from said photodetectors.

5. The multiple-wavelength light source according to claim 4, further comprising a common substrate, said semiconductor laser devices, said optical waveguides, said diffraction gratings, said optical wavelength multiplexer/demultiplexer, said wavelength filter, said photodetectors, and said heaters being disposed on said common substrate.

6. The multiple-wavelength light source according to claim 4, wherein said optical wavelength multiplexer/demultiplexer comprises optical waveguides of silica including:

an input channel waveguide;

a first fan-shaped slab waveguide connected to said input channel waveguide;

an array waveguide diffraction grating comprising a plurality of channel waveguides connected perpendicularly to a diffracting surface of said first fan-shaped slab waveguide and having predetermined wavelength length differences;

a second fan-shaped slab waveguide connected to said array waveguide diffraction grating; and a plurality of output channel waveguides connected to said second fan-shaped slab waveguide.

7. A multiple-wavelength light source comprising:

a plurality of semiconductor laser devices;

a plurality of optical waveguides for leading laser beams emitted from said semiconductor laser devices to respective desired paths;

a plurality of diffraction gratings disposed in said optical waveguides, respectively, and serving as external vavities for said semiconductor laser devices, whereby laser beams having respective wavelengths determined by structural details of said diffraction gratings can be output;

a frequency modulating circuit for modulating currents injected into said semiconductor laser devices with different frequencies;

an optical wavelength multiplexer/demultiplexer for multiplexing the laser beams emitted from said semiconductor laser devices into a laser beam;

an optical branching circuit for branching the laser beam from said optical wavelength multiplexer/demultiplexer into as many laser beams as the number of desired wavelengths;

a photodetector for detecting the laser beams from said optical branching circuit and outputting voltages depending on respective detected power levels of the laser beams;

a plurality of electric filters for extracting modulation frequency components from the output voltages from said photodetectors;

a plurality of heaters disposed near said diffraction gratings, respectively, for varying temperatures of said diffraction gratings; and a heater current control circuit for supplying currents to said heaters, respectively, for maximizing the output voltages from said photodetectors.

8. The multiple-wavelength light source according to claim 7, further comprising a common substrate, said semiconductor laser devices, said optical waveguides, said diffraction gratings, said frequency modulating circuit, said optical wavelength multiplexer/demultiplexer, said optical branching circuit, said photodetectors, said electric filters, and said heaters being disposed on said common substrate.

9. The multiple-wavelength light source according to claim 7, wherein said optical wavelength multiplexer/demultiplexer comprises optical waveguides of silica including:

an input channel waveguide;

a first fan-shaped slab waveguide connected to said input channel waveguide;

an array waveguide diffraction grating comprising a plurality of channel waveguides connected perpendicularly to a diffracting surface of said first fan-shaped slab waveguide and having predetermined wavelength length differences;

a second fan-shaped slab waveguide connected to said array waveguide diffraction grating; and a plurality of output channel waveguides connected to said second fan-shaped slab waveguide.

10. A method of controlling oscillation frequencies of a multiple-wavelength light source to control oscillation wavelengths thereof, said multiple-wavelength light source comprising:

a plurality of semiconductor laser devices;

a plurality of optical waveguides for leading laser beams emitted from said semiconductor laser devices to respective desired paths;

a plurality of diffraction gratings disposed in said optical waveguides, respectively, and serving as external cavities for said semiconductor laser devices, whereby laser beams having respective wavelengths determined by structural details of said diffraction gratings can be output;

said method comprising the steps of:

providing a plurality of heaters disposed near said diffraction gratings, respectively, for varying temperatures of said diffraction gratings;

multiplexing the laser beams emitted from said semiconductor laser devices into a laser beam;

demultiplexing the laser beam into a plurality of laser beams having desired wavelengths;

detecting the demultiplexed laser beams and outputting voltages depending on detected power levels of the laser beams; and supplying currents to said heaters, respectively, in order to maximize said voltages.

11. A method of controlling oscillation frequencies of a multiple-wavelength light source to control oscillation wavelengths thereof, said multiple-wavelength light source comprising:

a plurality of semiconductor laser devices;

a plurality of optical waveguides for leading laser beams emitted from said semiconductor laser devices to respective desired paths;

a plurality of diffraction gratings disposed in said optical waveguides, respectively, and serving as external cavities for said semiconductor laser devices, whereby laser beams having respective wavelengths determined by structural details of said diffraction gratings can be output;

said method comprising the steps of:

providing a plurality of heaters disposed near said diffraction gratings, respectively, for varying temperatures of said diffraction gratings;

multiplexing the laser beams emitted from said semiconductor laser devices into a laser beam;

branching the laser beam into as many laser beams as the number of desired wavelengths;

extracting laser beams of desired wavelengths from the divided laser beams;

detecting the extracted laser beams and outputting voltages depending on detected power levels of the laser beams; and supplying currents to said heaters, respectively, in order to maximize said voltages.

12. A method of controlling oscillation frequencies of a multiple-wavelength light source to control oscillation wavelengths thereof, said multiple-wavelength light source comprising:

a plurality of semiconductor laser devices;

a plurality of optical waveguides for leading laser beams emitted from said semiconductor laser devices to respective desired paths;

a plurality of diffraction gratings disposed in said optical waveguides, respectively, and serving as external cavities for said semiconductor laser devices, whereby laser beams having respective wavelengths determined by structural details of said diffraction gratings can be output;

said method comprising the steps of:

providing a plurality of heaters disposed near said diffraction gratings, respectively, for varying temperatures of said diffraction gratings;

modulating currents injected into said semiconductor laser devices with different frequencies;

multiplexing the laser beams emitted from said semiconductor laser devices into a laser beam;

branching the laser beam into as many laser beams as the number of desired wavelengths;

outputting signals depending on detected power levels from the branched laser beams;

extracting modulation frequency components from said signals; and supplying currents to said heaters, respectively, in order to maximize voltages of the extracted modulation frequency components.

* * * * *